United States Patent [19]

Logan, Jr.

[11] Patent Number: 4,592,334

[45] Date of Patent: Jun. 3, 1986

[54] CHARCOAL CONCENTRATING IMPLEMENT

[76] Inventor: Clifford K. Logan, Jr., 7922 Hemingford Ct., Apt. #8, Oklahoma City, Okla. 73120

[21] Appl. No.: 672,202

[22] Filed: Nov. 16, 1984

[51] Int. Cl.⁴ ............................ F24B 3/00; A47J 37/00
[52] U.S. Cl. .................................. 126/25 B; 126/9 R; 220/19
[58] Field of Search ................ 126/25 B, 147, 59.5, 126/25 R, 25 A; 44/34, 35, 38–41; 220/19

[56] References Cited

U.S. PATENT DOCUMENTS

| | | | |
|---|---|---|---|
| 2,740,395 | 4/1956 | Goodwin | 126/9 B X |
| 2,834,661 | 5/1958 | Chaplin | 126/25 B X |
| 3,112,716 | 12/1963 | Knight | 126/25 B |
| 3,168,062 | 2/1965 | Arnold | 126/59.5 |
| 4,102,317 | 7/1978 | Shonnard et al. | 126/25 B |
| 4,130,103 | 12/1978 | Zimmerman | 126/25 B |
| 4,281,813 | 8/1981 | Garrity | 220/19 X |
| 4,296,726 | 10/1981 | Ross et al. | 126/25 B |
| 4,372,351 | 2/1983 | Myers | 220/19 X |
| 4,461,270 | 7/1984 | Sutler | 126/25 B |
| 4,503,835 | 3/1985 | Williams | 126/25 B |
| 4,510,916 | 4/1985 | Ogden | 126/25 B |

Primary Examiner—Margaret A. Focarino
Attorney, Agent, or Firm—Hubbard, Thurman, Turner & Tucker

[57] ABSTRACT

A charcoal concentrating implement for a charcoal grill which restrains the charcoal in an enclosure resting on the firebox of the grill under the cooking surface either by itself, or in combination with the sides of the firebox. The charcoal is concentrated in only a portion of the firebox supporting surface. A quicker, hotter fire for cooking is obtained with a reduction in the amount of charcoal and charcoal lighter fluid required.

16 Claims, 7 Drawing Figures

CHARCOAL CONCENTRATING IMPLEMENT

BACKGROUND OF THE INVENTION

1. Field of the Invention

This invention relates generally to charcoal burning cooking grills and more specifically to an implement for a charcoal grill which concentrates the charcoal to get a hotter, quicker fire with less fuel.

2. Description of the Prior Art

Charcoal cooking grills are commonly made in a rectangular shape or in the form of a large shallow bowl usually mounted on legs for outdoor cooking. There is a charcoal supporting surface which is generally horizontal which may also be flat or concave. Upwardly sloping sides support a cooking surface in the form of a grillwork with parallel bars across the opening at the top of the grill or with a combination of intersecting parallel bars at right angles for holding food to be cooked.

Charcoal cooking grills must have a cooking surface sufficiently large to conveniently hold a number of pieces of meat spaced apart for cooking. The size of the grill may be thought of in terms of the amount of cooking surface area present in a particular design. Because the owner of the grill is likely to be cooking for a number of people at the same time, such grills usually have a surface area sufficient to cook at least four large steaks at the same time.

In the usual case, charcoal briquettes are poured into the grill body on the charcoal supporting surface, spread around, and partially wet with a flammable charcoal lighter fluid which is used to initiate combustion of the charcoal itself. Because heat rises vertically, it is difficult to get a charcoal fire going with only a thin layer of briquettes. The usual result of such an attempt is a vast mass of flames which consumes an excessive amount of fluid with most of the heat being lost.

Usually the body of the grill is filled to a greater depth than a thin layer of briquettes by pouring in more charcoal briquettes to obtain a double or triple layer of briquettes in the body of the grill. This is more efficient for lighting purposes because the fluid is dispersed down through several layers of briquettes. The fluid which soaks into the lower level of briquettes burns at that level and the flames and heat generated by that lower level burning is much more efficient for igniting the briquettes above the area of burning.

An alternative method of lighting a charcoal grill is accomplished by building a cone-shaped pyramid out of the briquettes prior to applying the lighter fluid. To get a pyramid with some degree of angle to its sides, it is necessary to laboriously place the briquettes into position by hand. By resting briquette upon briquette in this manner a pyramid having steeper sides can be made. The pyramid method does have the advantage of increasing the number of levels of briquettes one above the other which further increases the efficiency of the ignition of the charcoal briquettes above the lower level by means of the rising heat and flames.

This method is still not satisfactory however because it necessitates handling the charcoal piece by piece which results in soiled hands and clothing and it still requires a large quantity of charcoal and thus a large quantity of ignition fluid because the natural angle of repose of charcoal briquettes in a pyramid shaped cone requires a large base area, otherwise the pyramid will collapse.

If an attempt to make a steep pyramid is made it requires skill in placing the individual briquettes and even then some of them will fall off abd because of the flames will be impossible to replace on the pile once ignition has begun. These briquettes will generally remain unlighted or take a much longer time to light. In effect they are lost. Since a certain minimum amount of briquettes is needed to have an effective pyramid a greater amount of charcoal than is really needed to cook for a small number of people is used.

SUMMARY OF THE INVENTION

This invention is an implement for concentrating the charcoal in a charcoal grill in only a portion of the charcoal supporting surface of the grill which is especially useful when preparing the grill to cook for a small number of people. An upright member which forms an enclosure extending from the charcoal supporting surface or floor of the firebox of the grill conveniently concentrates the charcoal briquettes on only a portion of the charcoal supporting surface. The upright member is a charcoal restraining band which is preferably equipped with a plurality of openings to admit air into the area in which the briquettes are confined to aid in the combustion process. The band extends upwardly a sufficient distance to maintain a reasonable number of layers of briquettes in the area between the floor of the grill and the cooking surface but does not extend all the way upward to the cooking surface.

To use the implement the briquettes are poured into the area controlled by the implement and this forms the base of a multilayer column which can be conveniently heaped up in the center to obtain greater height.

Since a smaller amount of charcoal is used and the briquettes are stacked more or less vertically because of the confining effect of the implement, a lesser amount of charcoal lighter fluid is used in order to achieve uniform ignition. Ignition is achieved from the bottom up and from the inside out since the lighter fluid is concentrated there when it is poured over the briquettes. There is a chimney effect caused by the rising hot air which tends to draw air in through the perforations in the band and enhances burning. Thus a quicker, hotter fire is achieved with a savings in the amount of charcoal and charcoal lighter fluid needed for a good cooking fire.

In one embodiment the charcoal concentrating enclosure is formed by a straight band across a portion of the floor of the grill with a portion of the side of the grill functioning as the remainder of the charcoal restraining band.

Another embodiment has a charcoal enclosure formed by two essentially straight bands across the charcoal support floor of the grill. A portion of the upright side of the grill serves to complete the enclosure for confining the charcoal briquettes.

Another embodiment has an enclosure made by joining the ends of a long narrow perforated metal sheet into a continuous band in which the charcoal restraining effect is entirely within the band itself. The band is placed on the charcoal supporting surface under the grill before the enclosure it forms is loaded with charcoal.

In still other embodiments the charcoal concentrating implement equivalent to the band is made from looped or folded wire, wire mesh, or expanded metal.

Another embodiment is made from a section of a perforated fiberboard tube. Surprisingly the fiberboard tube serves to confine the charcoal during the critical ignition phase but it does not char sufficiently to disintegrate until a good hot fire is already started.

Thus it is an object of the present invention to provide an implement for reducing the amount of charcoal needed to make a satisfactory fire for cooking in a charcoal grill.

Another object of the invention is to start a faster fire which reaches cooking temperature sooner.

A further object of the invention is to concentrate on the heat produced by the ignited charcoal in an area less than the charcoal support area of the firebox to obtain more effective cooking.

Another object is to provide an inexpensive implement to concentrate the charcoal in a large grill to provide far more economical operation and avoid the necessity for having more than one grill on hand.

A further object is to have the benefit, and more, of pyramiding the charcoal in a grill without soiling the hands or clothing.

A further object is to obtain the benefits set forth in the other objects with a less expensive fiberboard charcoal concentrating implement which is consumed in the process.

The novel features which characterize the present invention are provided by the appended claims. The foregoing and other objects and advantages of the present invention will hereinafter appear, and for purposes of illustration, but not of limitation, preferred embodiments are shown in the drawings.

BRIEF DISCRIPTION OF THE DRAWINGS

DETAILED DESCRIPTION

Figure 1:
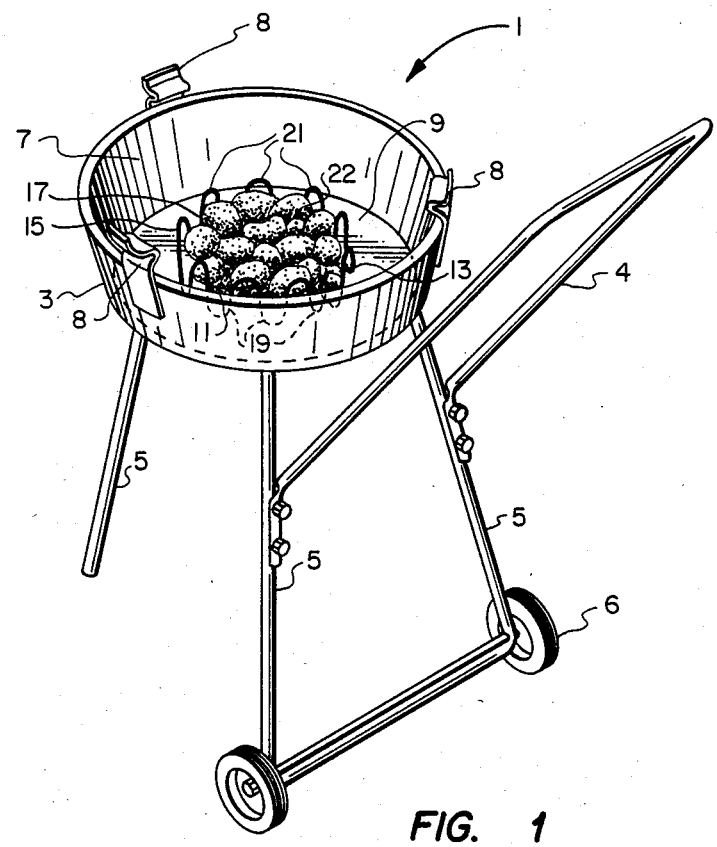
FIG. 1 is a perspective view of a charcoal grill with a charcoal concentrating implement in position on the charcoal support surface of a typical shallow bowl grill illustrating its charcoal concentrating feature.

A charcoal grill is designated generally by the reference numeral 1 in FIG. 1. The grill has a firebox 3 in the form of a generally circular shallow pan with upwardly curving surrounding side. The firebox 3 constitutes the major structural body of the grill to which legs 5 are attached. The legs 5 support the firebox on a surface and add overall height to the grill. The grill has a handle 4 and wheels 6.

A grillwork 7 (not shown) provides a flat cooking surface perferably in a horizontal orientation. It rests on grillwork support members such as member 8 and is supported over the firebox. The cooking surface or grillwork 7 will be referred to in those terms throughout this application to distinguish from the generic term grill which is used to designate the whole charcoal cooking structure.

The grillwork 7 supports the food to be grilled and it rests upon the firebox 3 or upon grillwork support members such as the members 8. The cooking surface is usually a series of parallel bars with spaces in between the bars or two groups of parallel bars at right angles to each other with openings all over the surface to be used for cooking so that the heat and flames from the burning charcoal in the firebox can cook the food. The cooking surface is conveniently removable from the grill for the purpose of cleaning or putting new charcoal in the firebox.

The firebox has a charcoal supporting surface 9 which may simply be the bottom of the bowl shaped firebox structure or it may be in the nature of a false bottom in the firebox which provides a flat surface on which the charcoal can rest. The charcoal supporting surface 9 can also be curved concavely in fireboxes with rounded bottoms. In either case the area occupied by the upper surface of a cooking load of charcoal in the grill is a majority percentage of the total area of the cooking surface 7.

Charcoal grills are designed with the apparent expectation that most of the cooking surface will be located above burning charcoal briquettes so that most of the cooking surface can be utilized.

Charcoal grills are made in different sizes as determined by the amount of cooking surface are over the charcoal coals and are usually selected on the basis of having a sufficient cooking surface are for the largest expected crowd for which cooking will be done. This avoids the purchase of a small grill for one or two people and a larger grill for larger groups of people. This invention provides a means for utilizing a larger grill in cooking for a small number of people while at the same time improving the performance of the grill and reducing the amount of supplies needed to cook with it.

The invention is a charcoal concentrating implement which is designated generally by the reference numeral 13 in FIG. 1. The implement has an upright band 15 having openings or perforations 17 along the surface of the band.

In the embodiment shown in FIG. 1 the band 15 is curved. The band has a lower perimeter 19 at its bottom and an upper perimeter 21 at its top. An enclosure 11 is defined by the band 15 between its lower perimeter 19 and its upper perimeter 21 and may be thought of as the space confined between the perimeters and the band proper.

FIG. 1 shows the enclosure which has been loaded with charcoal briquettes 22 which are concentrated by the device of the invention within the enclosure. The briquettes are held in the form of a short column with the bottom most layer of the briquettes resting on the charcoal supporting surface 9 of the firebox 3. The implement 13 simply rests with its lower perimeter on the charcoal supporting surface and is conveniently moveable and removable from the firebox.

In order to use the charcoal concentrating implement the cooking surface is removed and the charcoal concentrating implement is placed in the firebox on the charcoal supporting surface. The implement is filled with a plurality of charcoal briquettes which may be heaped above the enclosure 11 referred to above to increase the height of the column. The band 15 has a generally uniform width between the upper and lower perimeters which is less than the distance between the charcoal supporting and the cooking surface. There is usually additional room which will permit rounding the charcoal up on the column of charcoal in the enclosure formed by the implement and above the level of the upper perimeter 21.

Charcoal lighter fluid is dispersed on the charcoal briquettes in the usual manner whereupon the fluid is ignited. The cooking surface 7 (not shown) is put back in place over the charcoal containing enclosure.

It will be seen that a smaller number of charcoal briquettes is employed when the charcoal concentrating implement is used in the grill. The charcoal is held by the band in the enclosure and does not spread out over the remainder of the charcoal supporting surface of the firebox. The perimeter of the enclosure encompasses an area which is only a fraction of the total area available to hold charcoal under the cooking surface.

The charcoal is stacked at least two and preferably three or more layers high in the enclosure, the total height being dependent upon the vertical space available between the support surface and the grillwork. In addition to a smaller amount of charcoal employed when the implement of the invention is used, a lesser amount of lighter fluid is also used because the charcoal is concentrated and stacked. The amount of lighter fluid required is proportional to the number of briquettes used and the area over which the briquettes are spread. To initiate burning of the briquettes rapidly, each briquette should have associated with it an amount of fluid sufficient to establish a self-sustaining area of burning on the surface of the briquette.

The multilevel stacking of the briquettes in a column arrangement which is provided by the invention increases the efficiency of the ignition process because burning tends to occur from the center portion of the enclosure outwardly and the heat from ignition of the lower levels and burning of the fluid at the base of the column of briquettes rises upwardly to aid in igniting the briquettes above. The heat is concentrated.

The concentrated heat rising above the column of briquettes tends to create a draft which draws air through the openings or perforations in the exposed band surface area between the perimeters of the band which further enhances burning by a chimney effect.

The result is a faster fire which is ready for cooking earlier than would be case if the charcoal were spead out a greater area of the grill and not stacked into a column by the implement. The heat is concentrated for rapid cooking and less fuel and fluid is needed since the location of the briquettes is controlled. It is not necessary to handle the briquettes by hand as is often done because the briquettes can be poured into the implement without touching them and this avoids soiled hands and clothing. In one embodiment the implement is made of metal which is not consumed by the fire and is reusable while in another embodiment the implement is consumed but not until after the fire is established.

Figure 2:
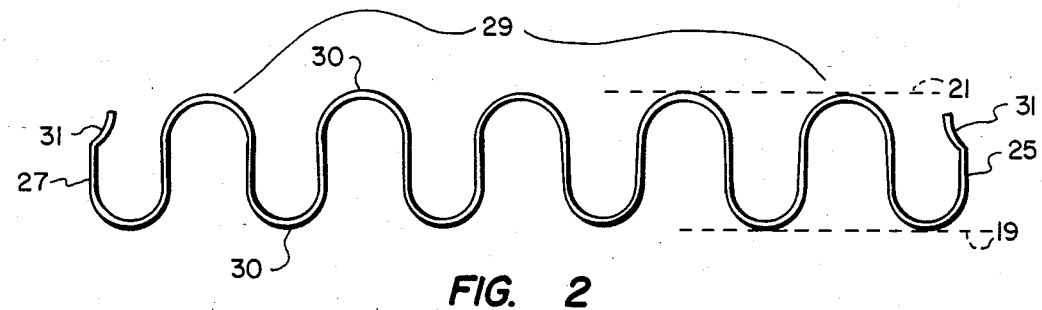
FIG. 2 is a plan view of a charcoal concentrating implement in the flat made from folded or looped wire before the ends are joined to create a charcoal concentrating band.

FIG. 2 shows laid out flat in a planar orientation a wire form of band of FIG. 1 in which wire is formed in loops or folds of roughtly the same dimensions. The wire is folded into serpentine reversing turns. The reversing turns have an apex 30 which corresponds to the location of the semicontinuous opposite edges of the band across the width. There is a first end 25, a second end 27 and an intermediate portion designated 29. The loops or folds are of a relatively uniform size such that the upper portion of the loops shown in the intermediate portion 29 correspond to the upper perimeter 21 of the enclosure of FIG. 1 and the lower portion of the loops correspond to the lower perimeter 19 of FIG. 1.

Mating hooks 31 on the ends 25 and 27 constitute a means for connecting the ends of the implement shown in FIG. 2 by bending the intermediate portion 29 to form a circular shaped enclosure. The form of the enclosure however need not be circular and the intermediate portion could be bent into other geometric shapes such as a square or a rectangular enclosure.

Figure 3:
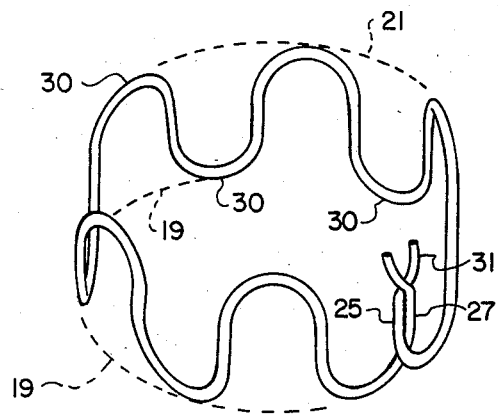
FIG. 3 is the looped or folded wire of FIG. 2 after it is bent into an implement for concentrating charcoal.

FIG. 3 is a perspective view of the implement shown in FIG. 2 when the ends are hooked together to form a band which encompasses a circular enclosure. A partially completed imaginary line drawn around the apex of the reversing turns defines the respective perimeters 19 and 21.

Figure 4:
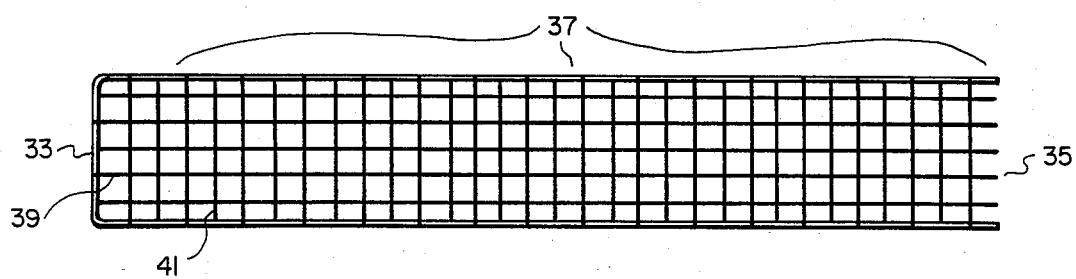
FIG. 4 is a view of wire mesh implement in the flat which can be bent to create a charcoal concentrating enclosure.

FIG. 4 is another embodiment of the implement of the invention showing the band in flat form made from a wire mesh structure. There is a first end 33, a second end 35 and an intermediate portion 37 between the ends. The wire mesh is made from groups of parallel wires at right angles to each other where the wires are welded, looped or fastened at points such as 39 where they cross. The top horizontal wire in FIG. 4 and the bottom horizontal wire in FIG. 4 correspond to the upper and lower perimeters of the implement shown in FIG. 1 when the FIG. 4 structure has its ends connected to form the enclosure 11. It is convenient to remove the last vertical wire from one of the ends, such as end 35, so that the horizontal wires at the end 35 can be wrapped around a vertical wire at or near the end 33. If the end 35 is wrapped around a vertical wire such as 41 in the intermediate section of the band by overlapping the end 33, a smaller diameter or adjustable diameter implement can be created.

Figure 5:
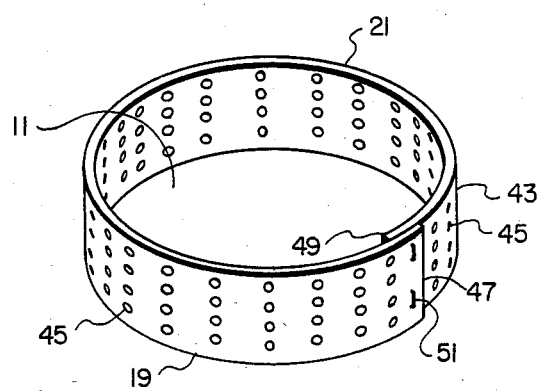
FIG. 5 is a perspective view of a charcoal concentrating implement in the form of a fiberboard band having ends stapled together.

Still another embodiment of the implement is shown in FIG. 5 where a band 43 having perforations 45 around its surface has a width which establishes the upper perimeter 21 and lower perimeter 19 of FIG. 1 to create the enclosure 11 of FIG. 1 as indicated in FIG. 5. A first end 47 and a second end 49 of the band are located in proximity to each other and fastened with staples 51. The enclosure created by the band can be varied in size by using more or less overlapping of the ends 47 and 49 before the staples or other fastening means are used to fix the ends in place. The staples are one of a number of means for connection which may include bolts, wire rings, short pieces of wire, intertwined ends, etc.

The design of FIG. 5 is particularly useful in making a very inexpensive, disposable implement. In that case the band 43 is made from perforated fiberboard of the type of stock that tubular fiber cores are made from which in the best mode is approximately one eighth inch thick and of solid construction. A flame resistant thickness is required in order to retain enough strength to hold the charcoal until it is substantially all lit.

Flat pieces can be supplied with bags of charcoal and stapled or wired to form the implement of the invention by the consumer. It has been found that although the charcoal will char and eventually burn through, it retains its charcoal holding ability until the charcoal is well lit and ready to cook on and all the charcoal is burning vigorously. It is consumed in the process and does not contribute any off flavor to the food cooked and should be selected with that in mind. Plastic or plastic-like components should be avoided for that reason. Although the charcoal will tend to spread out once the material is burned through, the goal of speed and reduced consumption of charcoal is achieved.

Figure 6:
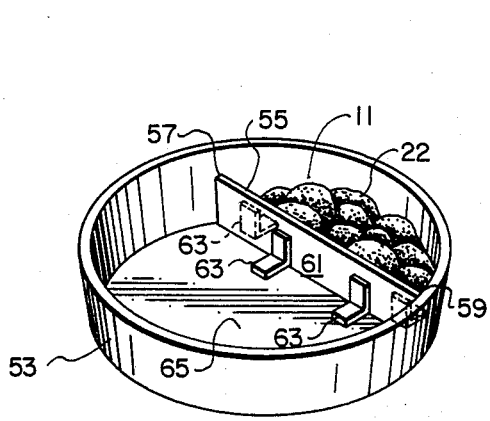
FIG. 6 is a perspective view of a charcoal concentrating implement in a grill utilizing a curved section of the sidewall of a charcoal grill to complete the charcoal confinement.

FIG. 6 shows a cut-away view of a firebox 53 of a charcoal grill showing another embodiment of the invention. In this case the band is an upright member 55 with a first end 57, a second end 59 and an intermediate section 61 which is equipped with support members 63 fixed to the intermediate portion at intervals which are designed to rest on the charcoal supporting surface 65.

The upright members act as a charcoal divider to divide off a portion of the charcoal support surface 65 of the firebox 53 because the ends 57 and 59 abut a portion of the firebox side 53 so that the enclosure 11 is formed between the upright member 55 and side of the firebox 53 for holding and burning charcoal 22 as before described.

Figure 7:
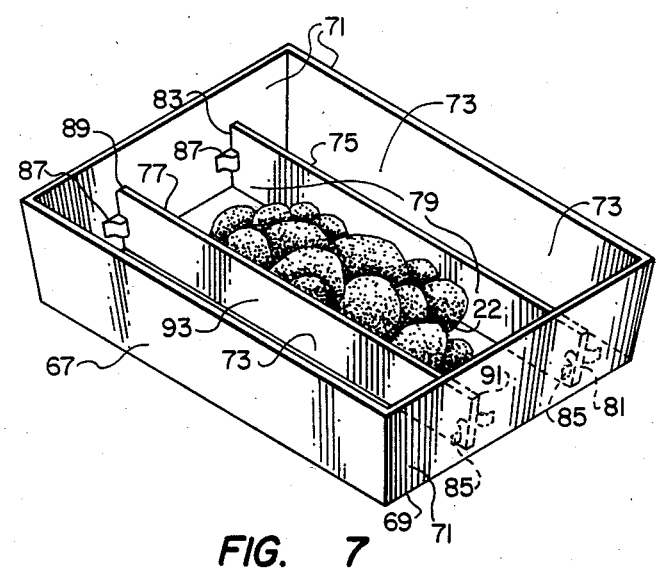
FIG. 7 is a perspective view of a charcoal concentrating implement utilizing two bands together with two sides of charcoal grill to complete a charcoal confinement area.

FIG. 7 illustrates another embodiment. A firebox 67 which is part of a charcoal grill has a charcoal supporting surface 69. The side of the firebox 71 supports a cooking surface 73 (not shown). An upright member 75 and an upright member 77 resting on the charcoal supporting surface divide off a reduced area of the charcoal supporting surface in the firebox and in conjunction with the side of the firebox form an enclosure 79. The ends 81 and 83 of the member 75 abut a portion of the firebox sides and are held in an upright position by fixtures 85 and 87 in which the upright member 75 (and correspondingly upright member 77) is held fixedly or removably. Upright member 77 has corresponding ends 89 and 91 adjacent the sides of the firebox and an intermediate portion 93 between said ends. The upright members are equivalent to straight bands which serve as charcoal dividers.

The fixtures may be of many different kinds such as a pair of projections on the sidewall where the ends abut in which the upright member can be lowered and held therebetween. They may be conveniently provided by drilling holes and fastening bolts which extend interiorly of the firebox wall. The fixtures 85 and 87 may be U-shaped clips fastened on the inside of the firebox sides 71 and it will be recognized that the upright member 77 will have similar fixtures a suitable distance from upright member 75 so as to provide a reduced portion of the charcoal supporting surface of the firebox as before.

The upright members are preferably perforated or have a regular pattern of openings to allow passage of combustion air. A series of such fixtures may be fixed along the sides so that by moving one or both of the upright members and enclosure of different dimensions can be made to provide more or less charcoal concentrating cooking area.

The upright members 75 and 77 can also be fixed into position in order to use the charcoal grill for small groups and if it is desired to use the entire charcoal supporting surface 69, charcoal is simply dumped all over the surface and the grill is used as it would be without the implement. In this embodiment and in the embodiment of FIG. 6, the upright member or members are preferably made from nonflammable material for reuse. The upright members can take the form of the folded or looped wire of FIG. 2, or may be made of expanded metal, perforated metal, wire mesh, etc.

Charcoal briquettes are commonly available in a ten pound bag. Although the briquettes from a particular supplier are generally uniform in size and shape, the size of the briquettes varies somewhat. One manufacturer has been found to have about 100 briquettes per ten pound bag whereas another manufacturer has been found to have about 140 briquettes in a ten pound bag. The size of the perforations or pattern of openings in the upright member or band is not critical as long as they can substantially restrain briquettes in the enclosure when they are piled up and allow combustion air to enter for burning.

In the best mode, the implement should be of such a size that the perimeter of the enclosure is equivalent to the perimeter of a four to twelve inch diameter circle which may typically be equivalent to about a seven inch diameter circle. The height of the upright member or band which is the distance between the upper perimeter and the lower perimeter must be at least one to one and a half inches to keep the briquettes from rolling out of the enclosure.

The maximum height is limited by the vertical space between the support surface and the cooking surface, which is usually three to six inches. For the embodiment where the implement is made from wire, ordinary steel wire in a range of about eight to sixteen gauge is desirable and wire of about 12 gauge is preferred. Wire coated with plastic or metals is to be avoided because of the possible problem of contamination of the food to be cooked.

A savings of about 50% in charcoal and lighter fluid can be expected when the implement is compared to the best alternative, which is to hand stack a pyramid of charcoal on the base of the charcoal grill. Using briquettes of 100 per ten pounds, I found that it took about one quarter to one third of a ten pound bag to handmake a suitable pyramid, so that about 35 to 40 briquettes were needed. Using the implement, a stack of briquettes about six to seven inches high required about 10 to 12 of the same briquettes and was suitable for cooking steaks or hamburgers four at a time. Without the implement you overbuild the fire when you cook for two to four people in an oridinary grill.

Using a bag of charcoal with briquettes that totalled 140 in a ten pound bag, a handmade pyramid stack in a grill required about 46 briquettes and one cup of charcoal lighter fluid and was ready for cooking in about 25 to 30 minutes. About six to seven of the briquettes around the base of the pyramid really didn't burn very well. Using the implement in the same grill and with the same fluid and briquettes a hot fire, which was ready for cooking in 12 to 15 minutes, required only about 20 briquettes with only one half cup of fluid.

This illustrates that the charcoal concentrating implement offers a significant savings in time in order to cook for a small group and does so with a significant savings in charcoal and fluid because it starts quicker and concentrates and transfers the heat quicker between the stacked briquettes. It is easier to light especially as compared to a flat bed of charcoal briquettes where invariably a portion of the briquettes don't receive sufficient fluid and go out which necessitates adding additional fluid to a grill containing some burning briquettes. The need for this dangerous practice is also reduced when the implement is used. The device of the invention can be conveniently shipped and stored in a flat to save space and can be quickly assembled.

I claim:

1. An improved charcoal burning grill having a charcoal concentrating implement comprising:
   (a) a fire box having a charcoal supporting surface with an upright sidewall completely surrounding the charcoal supporting surface,
   (b) restraining means for confining burning charcoal on a portion of said charcoal supporting surface,
   (c) said restraining means further comprising a band of generally uniform width having,
      a predetermined length, a first end, an intermediate portion with a pattern of openings and a second end along said length, said ends connected by means for connection, the edges of the band form an upper and a lower perimeter spaced apart by the width of the band, said lower perimeter being in supported contact with the charcoal supporting surface of the firebox, said band width corresponding to the height of a charcoal holding enclosure formed by the band and being less than the height of the sidewall of the firebox, and;
   (d) means for supporting food for cooking mounted on said firebox above said enclosure for cooking over a portion of the available charcoal supporting surface without using the remainder of said surface.

2. The implement of claim 1 which is freely removable from the firebox of the grill.

3. The implement of claim 2 in which the band is made of perforated sheet metal.

4. The implement of claim 2 wherein the band is made of wire mesh.

5. The implement of claim 4 wherein the band is made of wire mesh with wires parallel to the length and wires prependicular to the length.

6. The implement of claim 2 wherein the band is made of expanded metal sheet.

7. The implement of claim 2 wherein the band further comprises one or more wires folded into serpentine reversing turns which define the edges of the band wherein the distance of the turns along one edge from the turns along the opposite edge constitutes the width of the band, said edges being semicontinuous along the length, wherein the upper perimeter is defined by a line joining the apex of the reversing turns of the wire along one edge and the lower perimeter is defined by a line joining the apex of the reversing turns of the wire along the opposite edge, apexes of the turns in the wire along the lower perimeter forming locations which support the implement on the charcoal support surface of the grill.

8. The implement of claim 2 wherein the band is of consumable flammable fiber composition having sufficient flame resistant thickness when the enclosure is loaded with charcoal briquettes, soaked with flammable liquid and lit, so as to keep restraining and concentrating the burning charcoal until substantially all of the charcoal is well lit.

9. In a charcoal burning grill of the type having a firebox in which charcoal is confined for burning, the firebox having a surrounding side which supports a grillwork cooking surface, said firebox also having a charcoal supporting surface spaced below said cooking surface wherein the area of the supporting surface is bounded by the surrounding side of the firebox, wherein the improvement is a charcoal concentrating implement comprising:
   (a) charcoal restraining means for confining burning charcoal on a portion of the charcoal supporting surface;
   (b) said restraining means further comprising a band of generally uniform width having,
      a pre-determined length, said band having along said length, a first end, an intermediate portion with a regular pattern of openings and a second end, said intermediate portion being bent to bring said ends into overlapping relationship along a portion of the length of the band wherein the band has a doubled section between said ends, at least one of said ends being connected at an overlapped part of the band by a means for connection, the overlapped portions of the band being in juxtaposition with each other such that the edges of the band form an upper and a lower perimeter spaced apart by the width of the band, said upper and said lower perimeter forming a charcoal confining enclosure defined by the band, of a size which is variable depending on the amount of said overlapping part of the band, said lower perimeter being in supported contact with the charcoal supporting surface, and;
   (c) said restraining means is sized to fit under the grillwork cooking surface for cooking over a portion of the firebox charcoal support surface without using the remainder of said surface.

10. The implement of claim 9 which is freely removable from the firebox of the grill.

11. The implement of claim 10 in which the band is made of per forated sheet metal.

12. The implement of claim 10 wherein the band is made of wire mesh.

13. The implement of claim 12 wherein the band is made of wire mesh with wires parallel to the length and wires prependicular to the length.

14. The implement of claim 10 wherein the band is made of expanded metal sheet.

15. The implement of claim 10 wherein the band further comprises one or more wires folded into serpentine reversing turns which define the edges of the band wherein the distance of the turns along one edge from the turns along the opposite edge constitutes the width of the band, said edges being semicontinuous along the length, wherein the upper perimeter is defined by a line joining the apex of the reversing turns of the wire along one edge and the lower perimeter is defined by a line joining the apex of the reversing turns of the wire along the opposite edge, said apexes of the turns in the wire along the lower perimeter forming locations which support the implement on the charcoal support surface of the grill.

16. The implement of claim 10 wherein the band is of consumable flammable fiber composition having sufficient flame resistant thickness when the enclosure is loaded with charcoal briquettes, soaked with flammable liquid and lit, so as to keep restraining and concentrating the burning charcoal until substantially all of the charcoal is well lit.

* * * * *